Aug. 13, 1968  M. G. G. TIMMERMAN  3,397,008
TRACTOR CAB
Filed Feb. 7, 1966  2 Sheets-Sheet 1
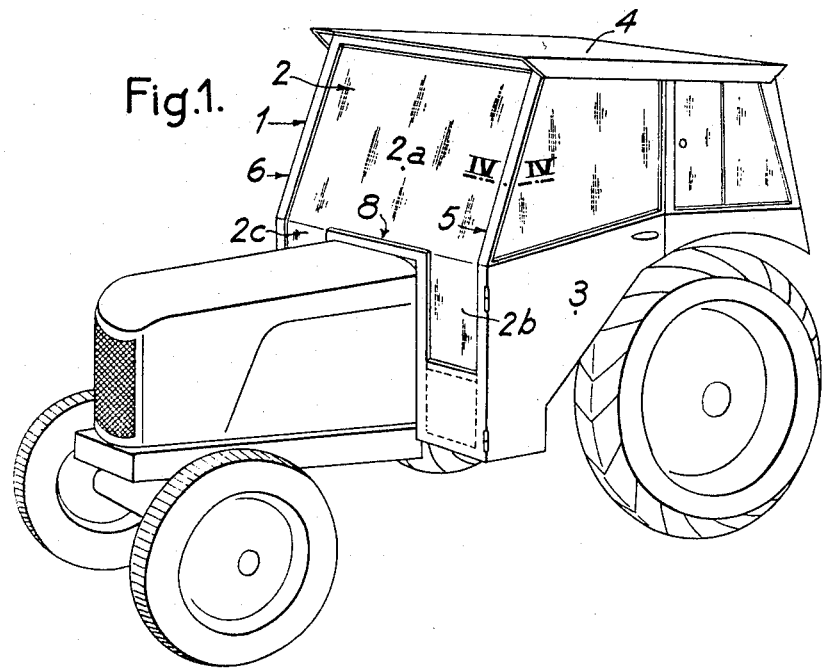
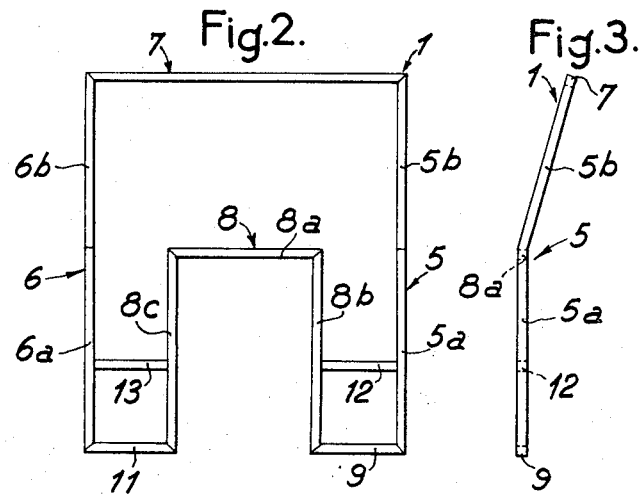
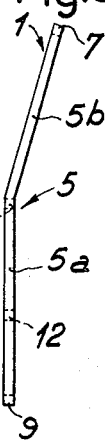
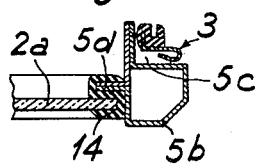

Aug. 13, 1968    M. G. G. TIMMERMAN    3,397,008
TRACTOR CAB
Filed Feb. 7, 1966    2 Sheets-Sheet 2
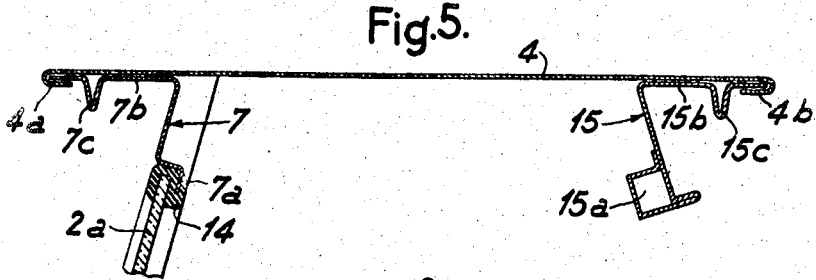
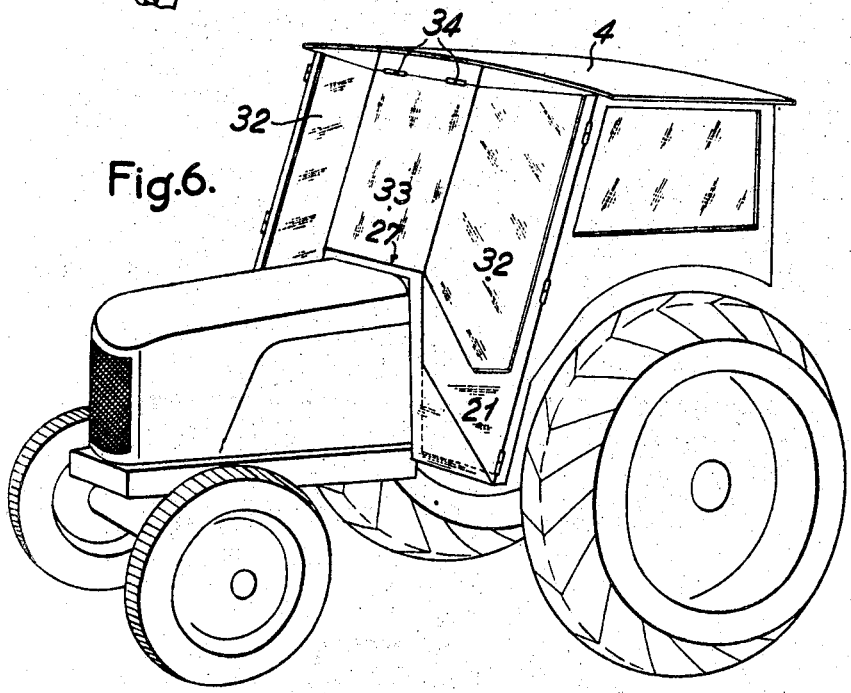
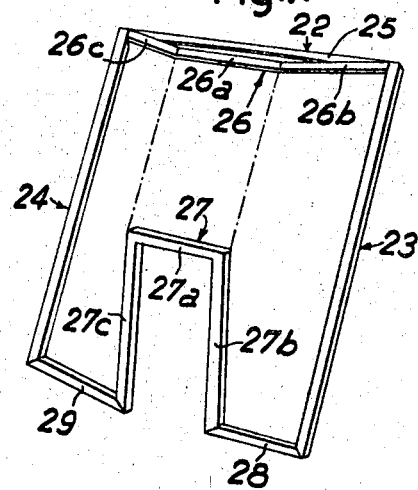

United States Patent Office 3,397,008
Patented Aug. 13, 1968

3,397,008
TRACTOR CAB
Maurice Gaston G. Timmerman, 24 Boite Portale,
Bergues, France
Filed Feb. 7, 1966, Ser. No. 525,544
Claims priority, application France, Feb. 8, 1965,
4,714
9 Claims. (Cl. 296—28)

ABSTRACT OF THE DISCLOSURE

A cab for a tractor having a hood comprises a rigid front frame consisting of two lateral posts spaced laterally from the hood, an upper cross member rigidly interconnecting the upper ends of the posts and a lower cross member of inverted U-shape consisting of a central horizontal portion extending across the top of the hood, two side portions extending down along opposite sides of the hood and connecting portions extending between and rigidly connecting the lower portions only of said side portions and the posts. Transparent sheet material mounted in the clear area provided by the frame extends between the lateral posts and below the hood at opposite sides of the frame. Doors hinged on these lateral posts open either laterally or forwardly. The cab roof comprises sheet material folded in under flange portions of the upper cross member of the front frame and a similar rear cross member.

---

This invention relates to tractors and has specific reference to tractor cabs.

It is the essential object of this invention to provide a tractor cab comprising a rigid front frame supporting the cab doors and windshield, characterized in that this frame comprises two lateral posts interconnected at their upper ends by a cross member and at their lower ends by a lower cross member comprising a central portion having the shape of an inverted U, adapted to straddle the hood of the tractor engine, and a pair of bracing members connecting the lower ends of the side elements of the inverted U to the lower ends of said lateral posts; no other connecting members are provided in the windshield zone between the lower cross member, the lateral posts and the upper cross member.

The tractor cab according to this invention is advantageous in that as its rigid front frame is constructed without resorting to stiffening intermediate members the visibility is substantially improved since the area of the flat or curved windshield glass pane is considerably larger than in hitherto known tractor cabs.

The tractor cab according to this invention can be equipped either with laterally opening doors or with front opening doors.

In order to afford a clearer understanding of this invention, a typical form of embodiment thereof will now be described with reference to the attached drawing, in which:

FIGURE 1 is a diagrammatic perspective view of a tractor equipped with a cab according to this invention, with laterally opening doors;

FIGURE 2 is an elevational view showing the front frame of the cab illustrated in FIGURE 1;

FIGURE 3 is a side elevational view of this front frame;

FIGURE 4 is a cross-sectional view taken along the line IV—IV of FIGURE 1, showing on a larger scale a lateral post of said frame;

FIGURE 5 is a fragmentary longitudinal section illustrating on a larger scale a detail of the mounting of the cab roof in the construction of FIGURE 1;

FIGURE 6 is a perspective view showing a modified cab construction with front opening doors;

FIGURE 7 is a perspective view showing the front frame of the structure illustrated in FIGURE 6.

The tractor cab illustrated in FIGURE 1 comprises a metal or plastic frame structure consisting for example of tubes, sections, etc., concealed or lined with metal plates or sheets. It comprises essentially a rigid front frame 1 shown more in detail in FIGURES 2 and 3. This front frame 1 constitutes a support for the windshield 2 and doors 3, in this case laterally-opening doors. The metal frame structure is covered by a roof 4.

According to this invention, the rigid front frame 1 (see FIGURES 2 and 3) comprises two parallel lateral posts 5 and 6 having respectively vertical lower sections 5a and 6a and upper sections 5b and 6b inclined to the rear in relation to said lower sections. The upper ends of the lateral posts 5 and 6 are interconnected by a rectilinear cross-member 7 in the case of a flat windshield 2.

At its lower portion the front frame 1 comprises a cross member incorporating a central portion 8 having the shape of an inverted U and consisting of an upper horizontal section 8a and two vertical side elements 8b and 8c. This central portion 8 of the lower cross member is secured through any suitable means to the engine hood of the tractor. The lower ends of the side elements 8b and 8c are respectively connected through horizontal bracing members 9 and 11 to the lower ends of lateral posts 5 and 6.

If necessary, other intermediate bracing members 12 and 13 interconnecting the side elements 8b and 8c and the vertical sections 5a, 6a of the lateral posts 5 and 6 may be provided.

The windshield 2 is carried by the front frame 1. In this specific form of embodiment, the windshield consists of three elements, namely an upper, relatively large section inclined to the rear and carried by the upper cross member 7, the upper sections 5b and 6b of the lateral posts 5 and 6, and the upper horizontal section 8a of the lower cross member (the inverted U member), and two lateral lower sections 2b and 2c disposed respectively the first one between section 5a of lateral post 5, bracing member 12 and side element 8b, and the other one between section 6a of lateral post 6, bracing member 13 and side element 8c. The upper section 2a and the lateral lower sections 2b and 2c of the windshield are disposed edge to edge with or without interposing a weatherstrip or like sealing element in the joints therebetween.

Since no intermediate connecting member is provided in the area covered by the windshield 2 between the central portion 8 of the lower cross member, the lateral posts 5 and 6 and the upper cross member 7, the visibility for the tractor driver is substantially improved in comparison with hitherto known cab constructions.

According to a modified form of embodiment the windshield panes or sections 2a, 2b and 2c may consist of a curved glass pane. In this case the upper cross member 7 must be curved to accommodate the curvature of the upper windshield pane 2a as well as the base element 8a and bracing members 12 and 13; in other words, all the transverse elements assist in holding the windshield 2.

The component elements of frame 1 as well as the other elements of the cab structure advantageously consist of folded sheet-metal sections. In FIGURE 4 showing in cross-section the upper section 5b of the left-hand lateral post 5, it will be seen that this post consists of two bent sheets or plates assembled by spot-welding to constitute a box-sectioned member. This post 5b provides a rabbet 5c in which the laterally opening door 3 is fitted. On the other hand it comprises a rib 5d having fitted thereon a rubber weatherstrip 14 for retaining in position the upper windshield pane or section 2a. The lateral lower sections 2b and 2c of the windshield are mounted in a similar manner on the various component elements of frame 1.

FIGURE 5 illustrates the method of securing the cab roof 4. This roof 4 is crimped to the upper cross member 7 of the front frame 1 and to the upper rear cross member 15 rigidly connected to the side portions of the cab.

The front cross member 7 has a lower stepped extension 7a having fitted thereon the weatherstrip 14 holding the upper windshield pane or section 2a. This cross member 7 further comprises a horizontal forwardly directed flange 7b formed with a depending folded rib 7c.

The rear cross member 15 comprises a box-sectioned lower portion 15a of bent and welded sheet-metal, and a backwardly directed flange 15b also formed with a depending rib 15c obtained by folding.

The roof 4 is secured to this pair of front and rear cross-members 7 and 15 by folding its edges 4a and 4b over the front edge of cross member 7 and the rear edge of cross member 15, respectively; thus, a convenient and efficient assembling of the roof 4 with the cab frame structure is obtained.

The tractor cab illustrated in FIGURE 6 comprises two front opening doors 21. These doors 21 are hingedly mounted on a front frame 22 shown separately in FIGURE 7. This frame 22 comprises two lateral posts 23 and 24 inclined to the rear and having their upper ends connected through a rectilinear horizontal cross member 25 and a forwardly-projecting reinforcement 26 comprising a central portion 26a parallel to said cross member 22 and two lateral portions 26b and 26c connecting the central section 26 to the respective ends of posts 23 and 24.

The frame 22 comprises at its lower portion a cross member comprising a central portion 27 having the shape of an inverted U, which is secured to the tractor engine hood. This central portion of the lower cross member consists of an upper central base or section 27a having vertical or depending lateral extensions 27b and 27c at its ends. The lower ends of extensions 27b and 27c are connected respectively to the lower ends of said lateral posts 23 and 24 by means of bracing members 28 and 29 inclined to the rear in relation to the transverse plane of the central portion 27.

Hingedly mounted on the lateral posts 23 and 24 are the front opening doors 21. Each door 21 comprises a glass pane 32 covering the major portion of its height. In the central portion is the windshield proper 33 mounted along its upper edge on the central portion 26a of frame 26 by means of hinges 34, the lower edge of the windshield pane resting on the central section 27a.

In this case it will be seen that no intermediate connecting elements are provided between the lower and upper portions of the frame 22, so that in the windshield zone 33 the driver's visibility is considerably improved.

The glasses 32 of the two front doors 21 fit with their edges against the side edges of the windshield proper 33, with or without using weatherstrips along the joints.

The windshield 33 and/or glass panes 32 of doors 21 may be plane or curved. According to cases the elements of the metal or plastic frame and of the doors which are provided for holding the glass panes are rectilinear or curved.

Of course, the various forms of embodiment of the invention which are described hereinabove with reference to the attached drawings are given by way of example only and should not be construed as limiting the invention since many modifications may be brought thereto without departing from the spirit and scope of the invention.

Thus, notably, the lateral posts 5, 6 or 23, 24 may diverge from each other instead of being parallel as shown. The lower portions 5a, 6a of lateral posts 5, 6 may be inclined instead of being vertical, the same also applying to the sections 8b and 8c of the U-shaped central portion 8 and the lateral lower sections 2a and 2b of the windshield. Finally, the upper portions 5b and 6b of the lateral posts may also be vertical or inclined forwards.

What I claim is:

1. A cab for a tractor having front and rear wheels, a main frame and a motor hood on a forward portion of the frame, said cab being mounted on a rear portion of the tractor frame and comprising a rigid front frame of opaque material, said frame consisting of two lateral posts on opposite sides of and spaced from a rear portion of said hood and extending vertically above said hood, an upper horizontal cross member rigidly interconnecting the upper ends of said posts and a lower cross member of inverter U-shape and consisting of a central horizontal portion extending across the top of said hood and having a lateral extent approximately equal to that of said hood, two side portions rigidly joined with said central portion and extending down along opposite sides of said hood and spaced laterally inwardly from lower portion of said posts and connecting portions extending between and rigidly interconnecting lower portions only of said side portions and said posts, said connecting portions being disposed wholly below said central portion, and transparent sheet material mounted in the area defined by said opaque frame and having portions extending between said posts above said central horizontal portion of said lower cross member and substantially continuous portions extending downwardly from said first mentioned portions and disposed between said posts and said side portions of said U-shaped lower cross member and above the connecting portions between said side portions and the lower portions of said posts, said cab including doors hinged to said side posts.

2. A tractor cab according to claim 1, in which said lateral posts comprise lower portions extending from the bottom of said posts to about the level of said central horizontal portion of said U-shaped lower cross member and upper portions inclined upwardly and rearwardly from said lower portions, said first mentioned portions of said transparent sheet material being correspondingly inclined with respect to said last mentioned portions of said transparent sheet material.

3. A tractor cab according to claim 2 in which said doors are side opening doors hinged on said lower portions of said lateral posts.

4. A tractor cab according to claim 1 in which said lateral posts are inclined to the rear from the vertical and said connecting portions of said lower cross frame are inclined to the rear in relation to the transverse plane of said central portion and said side portions, and in which said upper cross member comprises a central section parallel to and spaced from said central horizontal portion of the lower cross member and two lateral sections inclined rearwardly and connecting said central section with the upper ends of said lateral posts.

5. A tractor cab according to claim 4, in which said doors are front opening doors hinged to said lateral posts and having transparent portions extending laterally inwardly from said posts and downwardly below said central horizontal portion of said lower cross member.

6. A tractor cab according to claim 5, in which said transparent sheet material further comprises a central panel extending between said central portion of said lower cross member and said central section of said upper cross member and having lateral edges substantially contiguous with said transparent portions of said doors to provide an essentially continuous area of transparency between said lateral posts and extending below the central portion of said lower cross member.

7. A tractor cab according to claim 1, in which each of said lateral posts comprises two parts of sheet metal bent and welded together to form a box-girder element having a first flange extending rearwardly from the laterally inner wall of said box-girder element to receive a door and a second flange projecting laterally inwardly from said box-girder element to receive said transparent sheet material.

8. A tractor cab according to claim 1, in which said upper horizontal cross member comprises a sheet metal member of angle cross section with a downwardly extending portion having a recess to receive said transparent sheet material and a forwardly extending portion with a downwardly extending rib spaced from its forward edge, and in which said cab further comprises a roof of sheet material having a forward extending over said upper cross member and edge portion folded down under the forward edge portion of said upper cross member.

9. A tractor cab according to claim 8, further comprising a rear cross member supporting the rear portions of said roof and comprising a sheet metal member of angle cross section having a downwardly extending flange portion terminating in a box-girder, and a rearwardly extending flange portion with a downwardly extending rib spaced from its rear edge, the rear edge portion of the roof being folded down under the rear edge portion of said rearwardly extending flange.

References Cited

UNITED STATES PATENTS

| | | | |
|---|---|---|---|
| 2,479,036 | 8/1949 | Campbell | 296—102 |
| 2,667,379 | 1/1954 | Baze | 296—102 |
| 3,206,245 | 9/1965 | Westrum et al. | 296—102 |

FOREIGN PATENTS 821,326  10/1959  Great Britain.

BENJAMIN HERSH, *Primary Examiner.*

L. D. MORRIS, *Assistant Examiner.*